US008648143B2

(12) United States Patent
Weber et al.

(10) Patent No.: US 8,648,143 B2
(45) Date of Patent: Feb. 11, 2014

(54) PROCESS FOR PRODUCING THERMOPLASTIC MOLDING COMPOSITIONS BASED ON STYRENE COPOLYMERS AND POLYAMIDE WITH IMPROVED TOUGHNESS

(75) Inventors: Martin Weber, Maikammer (DE); Marko Blinzler, Mannheim (DE); Norbert Güntherberg, Speyer (DE)

(73) Assignee: Styrolution GmbH (DE)

( * ) Notice: Subject to any disclaimer, the term of this patent is extended or adjusted under 35 U.S.C. 154(b) by 0 days.

(21) Appl. No.: 13/547,830

(22) Filed: Jul. 12, 2012

(65) Prior Publication Data

US 2013/0023619 A1 Jan. 24, 2013

Related U.S. Application Data

(63) Continuation of application No. PCT/EP2011/050294, filed on Jan. 12, 2011, and a continuation of application No. 12/986,718, filed on Jan. 7, 2011, now abandoned.

(60) Provisional application No. 61/295,777, filed on Jan. 18, 2010.

(30) Foreign Application Priority Data

Jan. 18, 2010 (EP) .................................... 10150933

(51) Int. Cl.
*C08G 81/02* (2006.01)
*C08L 67/02* (2006.01)
*C09B 67/00* (2006.01)

(52) U.S. Cl.
USPC ........... 524/514; 524/502; 525/165; 525/178; 525/179

(58) Field of Classification Search
USPC .......................... 524/504, 514; 525/165, 178
See application file for complete search history.

(56) References Cited

U.S. PATENT DOCUMENTS

| | | | |
|---|---|---|---|
| 4,537,949 A | 8/1985 | Schmidt et al. | |
| 4,540,722 A | 9/1985 | Bunker | |
| 6,384,143 B1 * | 5/2002 | Nishihara et al. | 525/191 |
| 6,423,817 B1 | 7/2002 | Weinerth et al. | |
| 6,812,323 B1 | 11/2004 | Breiner et al. | |
| 6,945,687 B2 | 9/2005 | Guntherberg et al. | |
| 7,671,127 B2 | 3/2010 | Weber et al. | |
| 7,919,013 B2 | 4/2011 | Weber et al. | |
| 8,119,723 B2 | 2/2012 | Weber et al. | |
| 2003/0183979 A1 * | 10/2003 | Guntherberg et al. | 264/211.21 |
| 2004/0094862 A1 * | 5/2004 | Sturm et al. | 264/211 |
| 2004/0167264 A1 * | 8/2004 | Vathauer et al. | 524/401 |
| 2007/0106022 A1 | 5/2007 | Weber et al. | |
| 2010/0036043 A1 * | 2/2010 | Weber et al. | 524/504 |
| 2010/0130685 A1 | 5/2010 | Weber et al. | |
| 2011/0306701 A1 | 12/2011 | Weber et al. | |
| 2011/0319550 A1 | 12/2011 | Weber et al. | |
| 2012/0059109 A1 | 3/2012 | Weber et al. | |
| 2012/0181487 A1 | 7/2012 | Gibon et al. | |

FOREIGN PATENT DOCUMENTS

| | | |
|---|---|---|
| DE | 19812135 A1 | 9/1999 |
| DE | 102005036981 A1 | 2/2007 |
| EP | 129195 A2 | 12/1984 |
| EP | 129196 A2 | 12/1984 |
| EP | 0202214 A2 | 11/1986 |
| EP | 0402528 A2 | 12/1990 |
| EP | 0784080 A1 | 7/1997 |
| WO | WO-95/28443 A1 | 10/1995 |
| WO | WO-9813412 A1 | 4/1998 |
| WO | WO-99/41297 A1 | 8/1999 |
| WO | WO-2008/101888 A1 | 8/2008 |
| WO | WO-2009/103714 A1 | 8/2009 |
| WO | WO-2009/156378 A1 | 12/2009 |
| WO | WO-2010/003891 A1 | 1/2010 |
| WO | WO-2010/089245 A1 | 8/2010 |
| WO | WO-2010/089258 A1 | 8/2010 |
| WO | WO-2010/130621 A1 | 11/2010 |
| WO | WO-2011/023541 A1 | 3/2011 |

* cited by examiner

*Primary Examiner* — Hannah Pak

(74) *Attorney, Agent, or Firm* — Novak Druce Connolly Bove + Quigg LLP

(57) ABSTRACT

Processes for producing thermoplastic molding compositions, which comprise
a) from 3 to 79% by weight of one or more (methyl)styrene-acrylonitrile copolymers, which have no maleic-anhydride-derived units,
b) from 15 to 91% by weight of one or more polyamides,
c) from 5 to 50% by weight of one or more rubbers,
d) from 1 to 25% by weight of one or more compatibilizers,
e) from 0 to 2% by weight of one or more low-molecular-weight compounds which comprise a dicarboxylic anhydride group,
f) from 0 to 50% by weight of one or more fibrous or particulate fillers, and
g) from 0 to 40% by weight of further additives,
by producing a melt comprising components A, B, and C in a first step and subsequently incorporating D,
Also, thermoplastic molding compositions obtainable by these processes, the use of these thermoplastic molding compositions, and moldings, fibers, and foils comprising these thermoplastic molding compositions.

12 Claims, No Drawings

PROCESS FOR PRODUCING THERMOPLASTIC MOLDING COMPOSITIONS BASED ON STYRENE COPOLYMERS AND POLYAMIDE WITH IMPROVED TOUGHNESS

CROSS REFERENCE TO RELATED APPLICATIONS

This application is a continuation of application Ser. No. 12/986,718, filed Jan. 7, 2011, which claims benefit to U.S. provisional application 61/295,777, filed Jan. 18, 2010. This application also claims priority to International Application PCT/EP2011/050294, filed Jan. 12, 2011, which claims priority to European Application 10150933.9, filed Jan. 18, 2010, wherein the disclosures of each are incorporated herein by reference in their entirety.

DESCRIPTION

The invention relates to processes for producing thermoplastic molding compositions, where the thermoplastic molding compositions comprise
- a) as component A, from 3 to 79% by weight of one or more (methyl)styrene-acrylonitrile copolymers, which have no maleic-anhydride-derived units,
- b) as component B, from 15 to 91% by weight of one or more polyamides,
- c) as component C, from 5 to 50% by weight of one or more rubbers,
- d) as component D, from 1 to 25% by weight of one or more compatibilizers,
- e) as component E, from 0 to 2% by weight of one or more low-molecular-weight compounds which comprise a dicarboxylic anhydride group,
- f) as component F, from 0 to 50% by weight of one or more fibrous or particulate fillers, and
- g) as component G, from 0 to 40% by weight of further additives, where each of the % by weight values is based on the total weight of components A to G, and these give a total of 100% by weight,
via mixing of components A to G in the melt,
and also to thermoplastic molding compositions obtainable by these processes, the use of these thermoplastic molding compositions, and also moldings, fibers, and foils comprising these thermoplastic molding compositions.

Polymeric blends made of (methyl)styrene-acrylonitrile copolymers and of polyamides are known per se. Binary blends made of these polymer components have very poor toughness values, because of the incompatibility between polyamide and, for example, styrene-acrylonitrile copolymer. Use of compatibilizers can significantly improve the toughness of the blends, and also their chemicals resistance, as described by way of example in EP 202 214 B1, EP 402 528 A2, and EP 784 080 B1. The sequence of mixing of the polymer components and compatibilizer during production of the blends HMS/ma 18.01.10 made of (methyl)styrene-acrylonitrile copolymers and of polyamides is in principle described in the abovementioned specifications as being any desired sequence, and all of the components are generally introduced together into a mixing apparatus, i.e. are mixed with one another in the melt simultaneously in a single step of the process. Particularly suitable compatibilizers are styrene-acrylonitrile-maleic anhydride terpolymers, styrene-N-phenylmaleimide-maleic anhydride terpolymers, and methyl methacrylate-maleic anhydride copolymers. It is assumed that the amino or carboxy end groups of the polyamides react with the functional groups of the abovementioned co- and terpolymers, thus producing in situ copolymers which provide compatibility between the styrene copolymer phase and the polyamide phase.

However, there are many applications for which the toughness level of known mixtures of (methyl)styrene-acrylonitrile copolymers and of polyamides is not satisfactory. The content of volatile components in the known mixtures is moreover disadvantageous in many applications.

It is therefore an object of the present invention to provide thermoplastic molding compositions which are based on impact-modified (methyl)styrene-acrylonitrile copolymers and on polyamides and which, when compared with known molding compositions of this type, exhibit a further improvement in impact resistance and/or lower content of volatile components.

The processes mentioned in the introduction have accordingly been found, and it is essential to the invention here that a melt comprising components A, B, and C is produced in a first step of the process, in the absence of component D, and that the mixing to incorporate component D into this melt is delayed to a subsequent second step of the process.

Thermoplastic molding compositions obtainable by these processes have moreover been found, as also has the use of these thermoplastic molding compositions, and also moldings, fibers, and foils which comprise these thermoplastic molding compositions.

When the thermoplastic molding compositions that can be produced by the processes of the invention are compared with known molding compositions based on impact-modified (methyl)styrene-acrylonitrile copolymers and on polyamides, they exhibit a further improvement in impact resistance and/or lower content of volatile components.

The processes and articles of the invention are described below.

The thermoplastic molding compositions that can be produced by the processes of the invention comprise
- a) from 3 to 79% by weight, preferably from 5 to 55% by weight, particularly preferably from 10 to 25% by weight, of component A,
- b) from 15 to 91% by weight, preferably from 25 to 78% by weight, particularly preferably from 35 to 60% by weight, of component B,
- c) from 5 to 50% by weight, preferably from 15 to 45% by weight, particularly preferably from 25 to 40% by weight of component C,
- d) from 1 to 25% by weight, preferably from 2 to 15% by weight, particularly preferably from 3 to 7% by weight, of component D,
- e) from 0 to 2% by weight, preferably from 0 to 1% by weight, particularly preferably from 0 to 0.5% by weight, of component E,
- f) from 0 to 50% by weight, preferably from 0 to 38% by weight, particularly preferably from 0 to 27% by weight, of component F, and
- g) from 0 to 40% by weight, preferably from 0 to 10% by weight, particularly preferably from 0 to 5% by weight, of component G, and each of the % by weight values is based on the total weight of components A to G, and these give a total of 100% by weight.

Component A

The thermoplastic molding compositions of the invention comprise, as component A, one or more (methyl)styrene-acrylonitrile copolymers which have no maleic-anhydride-derived units. (Methyl)styrene-acrylonitrile copolymers are any of the copolymers which are obtainable via copolymerization of one or more vinylaromatic monomers, preferably from styrene and/or α-methylstyrene, with acrylonitrile; any desired other suitable monomers that differ from maleic anhydride can be present here in the copolymers, alongside the abovementioned monomers. Component A is preferably a styrene-acrylonitrile copolymer and/or an α-methylstyrene-acrylonitrile copolymer. (Methyl)styrene-acrylonitrile copolymers and the production thereof are known to the person skilled in the art and are described in the literature.

Preferred components A are composed of from 50 to 90% by weight, preferably from 60 to 80% by weight, in particular from 65 to 78% by weight, of vinylaromatic monomers, in particular styrene and/or a-methylstyrene, and from 10 to 50% by weight, preferably from 20 to 40% by weight, in particular from 22 to 35% by weight, of acrylonitrile, and also from 0 to 5% by weight, preferably from 0 to 4% by weight, in particular from 0 to 3% by weight, of further monomers, where each of the % by weight values is based on the weight of component A, and these give a total of 100% by weight.

The abovementioned further monomers that can be used are any monomers that are copolymerizable and differ from maleic anhydride, examples being p-methylstyrene, tert-butylstyrene, vinylnaphthaline, alkyl acrylates and/or alkyl methacrylates, for example those having $C_1$-$C_8$-alkyl radicals, N-phenylmaleimide, and mixtures of these.

The copolymers of component A can be produced by methods known per se. By way of example, they can be produced via free-radical polymerization, in particular via emulsion, suspension, solution, or bulk polymerization.

Component A is preferably rubber-free.

Component B

The thermoplastic molding compositions of the invention comprise, as component B, one or more polyamides. Polyamides and production thereof are known to the person skilled in the art and are described in the literature (see, for example, WO 95/28443, WO 99/41297 and DE-A 198 12 135).

Polyamides are understood to be homopolymers or copolymers which have repeat amide groups as essential constituent in the main polymer chain. Examples of these polyamides are nylon-6 (polycaprolactam), nylon-6,6 (polyhexamethyleneadipamide), nylon-4,6 (polytetramethyleneadipamide), nylon-5,10 (polypentamethyleneadipamide), nylon-6,10 (polyhexamethylenesebacamide), nylon-7 (polyenantholactam), nylon-11 (polyundecanolactam), nylon-12 (polydodecanolactam). Nylon-6 is preferably used as component B.

In another preferred embodiment, a polyamide is used as component B and comprises, based on the entirety of component B, from 0.01 to 1% by weight, preferably from 0.05 to 0.5% by weight, in particular from 0.1 to 0.2% by weight, of end groups that derive from triacetonediamine (TAD).

It is also possible to use polyamides that have been produced via copolycondensation of two or more of the abovementioned monomers or components thereof, e.g. copolymers of adipic acid, isophthalic acid, or terephthalic acid and hexamethylenediamine, or copolymers of caprolactam, terephthalic acid, and hexamethylenediamine. Semiaromatic copolyamides of this type preferably comprise from 40 to 90% by weight of units derived from terephthalic acid and from hexamethylenediamine. A small proportion of the terephthalic acid, and preferably not more than 10% by weight of the entirety of aromatic dicarboxylic acids used, can be replaced by isophthalic acid or by other aromatic dicarboxylic acids, preferably those in which the carboxy groups are in para-position. A preferred semiaromatic polyamide is nylon-9, T, derived from nonanediamine and terephthalic acid. The semiaromatic copolyamides can by way of example be produced by the process described in EP-A-129 195 and EPA-129 196.

Component C

The thermoplastic molding compositions that can be produced in the invention comprise, as component C, one or more rubbers. In principle, any of the elastomeric polymers or elastomers known to the person skilled in the art is suitable. Examples of suitable materials are graft rubbers based on butadiene, for example butadiene/styrene, and EPDM (ethylene-propylene-diene rubbers), or alkyl acrylates. The glass transition temperature Tg of these elastomeric polymers is generally ≤0° C.

Particularly suitable rubbers C for the purposes of the present invention are those which comprise a diene rubber based on dienes such as butadiene or isoprene, an alkyl acrylate rubber based on alkyl esters of acrylic acid, e.g. n-butyl acrylate and 2-ethylhexyl acrylate, an EPDM rubber based on ethylene and propylene, and on a diene, a silicone rubber based on polyorganosiloxanes, or any mixture of these rubbers and, respectively, rubber monomers.

A rubber C to which particular preference is given is a graft polymer made of a graft base, in particular a crosslinked diene graft base or a crosslinked alkyl acrylate graft base, and of one or more graft shells, in particular one or more styrene, acrylonitrile or methyl methacrylate graft shells.

Processes for producing the elastomeric polymers are known to the person skilled in the art and are described in the literature.

Component D

The thermoplastic molding compositions that can be produced by the processes of the invention comprise, as component D, one or more compatibilizers. These compatibilizers suitable for mixtures of (methyl)styrene-acrylonitrile copolymers and polyamides are known to the person skilled in the art and are described in the literature.

Components D that can be used with preference as compatibilizers are (methyl)styrene-acrylonitrile copolymers which, based on the entirety of component D, have from 0.5 to 5% by weight of maleic-anhydride-derived units. This proportion of maleic anhydride is preferably from 1 to 3% by weight, in particular from 2.0 to 2.2% by weight. In principle, the materials can also comprise further monomer components, in particular N-phenylmaleimide.

Component D is particularly preferably a styrene-acrylonitrile-maleic anhydride terpolymer. The proportion of acrylonitrile, based on the entirety of the terpolymer, is preferably from 10 to 30% by weight in the terpolymer, particularly preferably from 15 to 30% by weight, in particular from 20 to 25% by weight, and the proportion of maleic-anhydride-derived units corresponds to the amounts mentioned above. The remainder is made up by styrene.

The molar masses $M_w$ of the maleic-anhydride-containing (methyl)styrene-acrylonitrile copolymers that can be used with preference are generally from 30 000 to 500 000 g/mol, preferably from 50 000 to 250 000 g/mol, in particular from 70 000 to 200 000 g/mol, determined by GPC, using tetrahydrofuran (THF) as eluent, and polystyrene calibration.

Component E

A low-molecular-weight compound which has only one dicarboxylic anhydride group can be used concomitantly as further component E. For the purposes of the present inventions, low-molecular-weight compounds are those with molar mass less than 1000 g/mol. However, it is also possible to use two or more of these compounds as component E. These compounds can comprise, alongside the dicarboxylic anhydride group, further functional groups, where these can react with the end groups of the polyamides. Examples of suitable compounds E are $C_4$-$C_{10}$-alkyldicarboxylic anhydrides, such as succinic anhydride, glutaric anhydride, and adipic anhydride. Cycloaliphatic dicarboxylic anhydrides can also be used, an example being cyclohexane-1,2-dicarboxylic anhydride. However, it is also possible to use dicarboxylic anhydrides which are ethylenically unsaturated or aromatic compounds, examples being maleic anhydride, phthalic anhydride, trimellitic anhydride, and mixtures of these. The compounds that can be used as component E and the production thereof, are known to the person skilled in the art and are described in the literature.

Component F

The thermoplastic molding compositions of the invention can comprise, as component F, one or more fibers or particulate fillers. Preferred fibrous fillers or fibrous reinforcing materials are carbon fibers, potassium titanate whiskers, aramid fibers, and particularly preferably glass fibers. If glass fibers are used, these can have been equipped with size and with an adhesion promoter, to improve compatibility with the matrix material. The diameter of the carbon fibers and glass fibers used is generally in the range from 6 to 20 μm. The glass fibers can be incorporated either in the form of short glass fibers or else in the form of long glass fibers or continuous-filament strands, and also by way of example in the form of what are known as rovings. The average length of the glass fibers in the finished injection molding is preferably in the range from 0.08 to 0.5 mm.

Carbon fibers or glass fibers can also be used in the form of textiles, mats, or glass silk rovings.

Suitable particulate fillers are amorphous silica, magnesium carbonate (chalk), powdered quartz, mica, talc, feldspar, glass beads, and in particular calcium silicates, such as wollastonite, and kaolin (particularly calcined kaolin).

Particularly preferred combinations of fillers are those made of glass fibers and wollastonite.

Component G

The thermoplastic molding compositions that can be produced in the invention can comprise, as component G, one or more further additives. In principle, any of the additives conventionally used in plastics and described in the literature and known to the person skilled in the art is suitable. For the purposes of the present invention, examples of additives conventionally used in plastics are stabilizers and oxidation retarders, agents to counteract decomposition due to heat and decomposition due to ultraviolet light, lubricants and mold-release agents, dyes and pigments, and plasticizers.

Examples of oxidation retarders and heat stabilizers are halides of metals of group I of the Periodic Table of the Elements, e.g. sodium halides, potassium halides, and lithium halides. It is also possible to use zinc fluoride and zinc chloride. It is also possible to use sterically hindered phenols, hydroquinones, substituted members of that group, secondary aromatic amines, if appropriate in conjunction with phosphorus-containing acids or salts of these, and mixtures of said compounds, preferably at concentrations of up to 1% by weight, based on the weight of the thermoplastic molding compositions. Examples of UV stabilizers are various substituted resorcinols, salicylates, benzotriazoles, and benzophenones, the amounts generally used of these being up to 2% by weight, based on the weight of the thermoplastic molding compositions.

Lubricants and mold-release agents, the amounts of which that can generally be added, based on the weight of the thermoplastic molding compositions, are up to 1%, are stearic acid, stearyl alcohol, alkyl stearates, and stearamides, and also esters of pentaerythritol with long-chain fatty acids. It is also possible to use stearates of calcium, of zinc, or of aluminum, and also dialkyl ketones, e.g. distearyl ketone. Calcium stearate is particularly suitable in the invention.

Production Processes

According to the processes of the invention, a melt comprising components A, B, and C is produced in a first step of the process, in the absence of component D and the mixing to incorporate component D into said melt is delayed until a subsequent second step of the process. If the intention is to admix one or more components E, F, or G, this can take place in the first step of the process or in the second step of the process, or else in both steps of the process. In principle it is of course also possible not to use the entire amount of components A, B, and C in the first step of the process, and instead to delay feeding of some amount of said components into the melt until the second step of the process.

The form in which component D is added to the melt comprising components A, B, C, and, if appropriate, E, F, and G can preferably be that of a solid, in particular of pellets, but in principle can also be that of a melt or a solution.

The production of the melt comprising components A, B, C, and, if appropriate, E, F, and G in the first step of the process, in the absence of component D, takes place by processes known to the person skilled in the art, for example via mixing of a melt of component A with the further components B and C, and/or, if appropriate, E, F, and G, using apparatuses known to the person skilled in the art, for example screw extruders, kneaders, or mixers, preferably at temperatures in the range from 220 to 300° C., in particular from 230 to 290° C. Each of the components can be introduced in pure form into the mixing apparatuses. However, it is also possible to begin by premixing individual components and then to mix them with the other components.

In the second step of the process of the invention, component D is incorporated by mixing into the melt obtained in the first step of the process. (It is also possible in the second step of the process to use mixing to incorporate some amounts of components A, B, and C which were not incorporated by mixing in the first step of the process.) The mixing to incorporate component D takes place by processes that are known to the person skilled in the art and that have been described above, examples being mixing in the melt in screw extruders, kneaders, or mixers. The average mixing time to achieve a homogeneous mixture, in both the first and the second step of the process, independently of one another, is generally from 5 sec to 30 min.

In one preferred embodiment of the processes of the invention, the thermoplastic molding compositions are produced via mixing in the melt in a screw extruder which comprises in this sequence along the direction of conveying, at least one feed zone, one plastifying zone, one homogenizing zone, and one discharge zone, where, after addition of components A, B, and C to the feed zone, in a first step of the process, in the absence of component D, a melt is produced, and, in a second step of the process, after addition of component D to the homogenizing zone, the mixing to incorporate component D into said melt is carried out.

Suitable screw extruders are described by way of example in Saechtling, Kunststoff-Taschenbuch [Plastics handbook], Hanser Verlag, Munich, Vienna, 26th edition, 1995, pp. 191 to 246.

Screw extruders usually have sections of different functionality, known as "zones". (See, for example, Kohlgrüber, Der gleichläufige Doppelschnecken-extruder [Corotating twin-screw extruders], Carl Hanser Verlag. Munich, 2007, pp. 61-75). The various zones of screw extruders are not necessarily identical with the individual components such as barrel sections or screw segments, from which the screw extruders have been assembled. One zone is generally composed of a plurality of components. The individual zones can, depending on function, have various spatial dimensions, for example various lengths or volumes.

Screw extruders usually have one or more of the zones described below. However, screw extruders can also have zones with a function not explicitly described below.

The feed zone is to be understood to mean that section of a screw extruder in which one or more components, for example a thermoplastically processable polymer, are introduced into the screw extruder. This introduction can be achieved by using a feed device, composed by way of example of an upper aperture in the screw extruder with superposed hopper, so that gravity conveys the feed component into the screw extruder. However, the feed device can also by way of example be composed of a conveying screw or of an extruder, via which the feed component is forced through the feed aperture of the screw extruder.

The plastifying zone (also often termed melting zone) is that section of a screw extruder in which a component, in particular components A, B, and C, is converted to a condition that is moldable by supply of heat, mostly molten or capable of plastic deformation. This is generally achieved via heating or via mechanical introduction of energy. For the introduction of mechanical energy it is possible to use, as plastifying elements, the components familiar to the person skilled in the art, examples being screw elements with very small degree of pitch in the direction of conveying, screw elements with pitch opposed to the direction of conveying, kneading blocks with conveying, neutral, or reverse-conveying pitch, or a combination of these elements. The selection of the type, number, and dimensions of the plastifying elements in the plastifying zone depends on the components of the thermoplastic molding compositions, in particular on the viscosity and softening point, and also the miscibility of the components.

The homogenizing zone is that section of a screw extruder in which one or more components are homogenized, at least one of these being in the condition that is moldable by supply of heat. Said homogenization is mostly achieved via mixing, kneading, or shearing. Examples of suitable mixing, kneading, and shearing elements are kneading blocks having narrow or wide, conveying or non-conveying kneading disks.

The discharge zone is that section of a screw extruder in which the thermoplastically processable molding composition is prepared discharged from the screw extruder and is discharged through the discharge aperture. The discharge zone is mostly composed of a conveying screw and of a closed barrel section terminated by a defined discharge aperture.

A die head is preferably used as discharge aperture and by way of example has been designed in the form of a die plate or die lip, where the dies can be circular (perforated die plate), slot-shaped, or of any other shape. When a die plate is used, the product discharged in the form of a strand is conventionally cooled and pelletized, for example in water.

If the thermoplastically processable molding composition is not first obtained in the form of pellets but is intended for direct further use, another advantageous method is further processing while the material is hot, or direct extrusion of sheets, foils, pipes, and profiles.

A screw extruder can moreover comprise further zones, such as deaeration zones or devolatilization zones, for the dissipation of gaseous constituents, or squeeze zones and dewatering zones, for the removal and discharge of liquid constituents, which can be water or else other substances. WO 98/13412 describes devolatilization zones, squeeze zones, and dewatering zones, and also the apparatus and arrangement used for these, and express reference is therefore made to the abovementioned specification in relation to said features.

The individual zones can be capable of clear delimitation spatially from one another, or can transform continuously into one another. By way of example, therefore, the transition from the plastifying zone to the homogenizing zone is not always capable of clear spatial delimitation in an extruder. There is often a continuous transition between the two zones.

As is well known, the various zones of a screw extruder can be individually heated or cooled, in order to establish an ideal temperature profile along the direction of conveying. Suitable heating and cooling equipment is known to the person skilled in the art.

The temperatures and spatial dimensions to be selected in any individual case for the individual zones differ as a function of the chemical and physical properties of the components and the quantitative proportions of these. By way of example, therefore, the mixing temperatures in the homogenizing zone are generally from 100 to 400° C., preferably from 200 to 320° C.

The screw extruders used can comprise single-screw extruders or twin-screw extruders, which may be corotating and intermeshing, contrarotating and intermeshing, or else non-intermeshing. It is preferable to use twin-screw extruders. Particular preference is given to corotating, intermeshing twin-screw extruders.

It is possible to use extruders having screws with small, moderate, or large flight depth (known as "deepcut screws"). The flight depth of the screws to be used depends on the type of machinery. The respective type of machinery to be used depends on the respective task.

The number of flights on the screws of the extruder can vary. It is preferable to use double-flighted screws. However, it is also possible to use screws having other numbers of flights, examples being single-flighted or triple-flighted screws, or screws which have sections with different numbers of flights.

The screw rotation rates of the extruder can vary widely. It is preferable to use relatively high rotation rates. Suitable rotation rates are in the range from 50 to 1800 rpm, preferably from 100 to 1000 rpm, particularly preferably from 200 to 900 rpm.

In one preferred embodiment of the processes of the invention, a screw extruder of effective length L is used for the mixing of components A, B, C, D, and, if appropriate, E, F, and G in the melt, where the effective length L is defined as the distance from the first feed device for the addition of components A, B, and/or C to the discharge aperture in the direction of conveying. Addition of components A, B, and C preferably takes place in the region from 0 L to 0.15 L, where a melt is produced in a first step of the process, in the absence of component D. Addition of component D, and incorporation by mixing into the melt comprising components A, B, and C, in the second step of the process, preferably takes place in the region from 0.3 L to 0.99 L, particularly preferably in the region from 0.35 L to 0.9 L, in particular in the region from 0.4 L to 0.7 L. Irrespective of the expressions "first step of the process" and "second step of the process", which serve for clarification, to the effect that the production of the melt comprising components A, B, and C on the one hand and the mixing to incorporate component D on the other hand are two chronologically and/or spatially separate procedures, the operation of the extruder is of course continuous and preferably steady-state.

The thermoplastic molding compositions of the invention can be used for producing moldings, fibers, and foils. They are particularly used for producing moldings, e.g. for motor-vehicle components or in electronic equipment.

When the thermoplastic molding compositions that can be produced by the processes of the invention are compared with known molding compositions based on impact-modified (methyl)styrene-acrylonitrile copolymers and on polyamides, they exhibit a further improvement in impact resistance and/or a lower content of volatile components.

The examples below provide further illustration of the invention.

EXAMPLES

Test Methods

The intrinsic viscosities IV of the (methyl)styrene-acrylonitrile copolymers and compatibilizers were determined to DIN 53727 on a 0.5% strength by weight solution in dimethylformamide at 25° C.

The intrinsic viscosities IV of the polyamides were determined to DIN 53727 on a 0.5% strength by weight solution in concentrated sulfuric acid (96% by weight $H_2SO_4$) at 25° C.

The average particle sizes of the graft copolymers used as rubbers were determined in the form of weight-average particle sizes by means of an analytical ultracentrifuge, using the method of W. Scholtan and H. Lange, Kolloid-Z, and Z.-Polymere 250 (1972), pp. 782 to 796.

The Vicat B heat-distortion temperature of the thermoplastic molding compositions was determined by means of the Vicat softening point. The Vicat softening point was determined to DIN 53 460, using a force of 49.05 N and a temperature rise of 50 K per hour, on standard small specimens.

The impact resistance $a_n$ of the thermoplastic molding compositions at room temperature (RT) and −30° C. was determined on ISO specimens to ISO 179 1eU. The notched impact resistance $a_k$ of the thermoplastic molding compositions at room temperature (RT) and −30° C. was determined on ISO specimens to ISO 179 1eA. Flowability MVI was determined to ISO 1133 at 240° C. with 10 kg load.

Contact of volatile compounds in the thermoplastic molding compositions was determined in the form of total C emission to VDA 277.

Starting Materials:
Component A-1
Copolymer of 75% by weight of styrene and 25% by weight of acrylonitrile, characterized via an intrinsic viscosity IV of 80 ml/g.
Component B-1
Ultramid® B27 from BASF SE, a nylon-6 obtained from c-caprolactam with intrinsic viscosity of 150 ml/g.
Component B-2
Nylon-6, obtained from c-caprolactam, with 0.16% by weight triacetonediamine content and intrinsic viscosity of 130 ml/g.
Component C-1
Particulate graft copolymer composed of 62% by weight of a graft base made of polybutadiene and 38% by weight of a graft shell made of 75% by weight of styrene and 25% by weight of acrylonitrile, with an average particle size of 400 nm.
Component C-2
Particulate graft copolymer composed of 70% by weight of a graft base made of polybutadiene and 30% by weight of a graft shell made of 75% by weight of styrene and 25% by weight of acrylonitrile, with an average particle size of 370 nm.
Component D-1
Terpolymer of 74.4% by weight of styrene, 23.5% by weight of acrylonitrile, and 2.1% by weight of maleic anhydride, with intrinsic viscosity IV of 66 ml/g.
Component E-1
Phthalic Anhydride
Component F-1
Chopped glass fiber with polyurethane size and with fiber diameter of 14 μm.
Component G-1
Irganox® PS 802 from BASF SE, a distearyl dithiopropionate.

Production of the Thermoplastic Molding Compositions and Determination of the Properties thereof:

The amounts of components A-G specified in tables 1 and 2 were fed into the respective regions 0 to 9 specified in tables 1 and 2 of a twin-screw extruder in continuous steady-state operation. (The effective length L of the extruder was ten times the screw diameter (10 D) and comprised 10 regions each of identical length 0.1 L, where the individual regions were numbered sequentially in the direction of conveying, beginning with region 0 and ending with region 9). The barrel temperature of the extruder was from 240 to 260° C. The melt discharged from the extruder was passed through a water bath and pelletized. The properties specified in table 1 were determined on said pellets or on test specimens injection-molded therefrom.

TABLE 1

Parts by weight of components, region of respective feed, and properties of molding compositions produced

| | Example* | | | | | | | | | | |
|---|---|---|---|---|---|---|---|---|---|---|---|
| | c-1 | c-2 | c-3 | c-4 | c-5 | 6 | 7 | 8 | c-9 | 10 | 11 |
| | Pts. by weight | | | | | | | | | | |
| A-1 | 18.8 | 18.8 | 18.8 | 18.8 | 18.8 | 18.8 | 18.8 | 18.8 | 13.8 | 13.8 | 13.8 |
| B-1 | 41 | 41 | 41 | 41 | 41 | 41 | 41 | 41 | — | — | — |
| B-2 | — | — | — | — | — | — | — | — | 53 | 53 | 53 |
| C-1 | 35 | 35 | 35 | 35 | 35 | 35 | 35 | 28 | 28 | 28 | 23 |
| C-2 | — | — | — | — | — | — | — | 7 | — | — | 5 |
| D-1 | 4.88 | 4.88 | 4.88 | 4.88 | 4.88 | 4.88 | 4.88 | 4.88 | 5 | 5 | 5 |
| E-1 | 0.12 | 0.12 | 0.12 | 0.12 | 0.12 | 0.12 | 0.12 | 0.12 | — | — | — |
| G-1 | 0.2 | 0.2 | 0.2 | 0.2 | 0.2 | 0.2 | 0.2 | 0.2 | 0.2 | 0.2 | 0.2 |

TABLE 1-continued

Parts by weight of components, region of respective feed, and properties of molding compositions produced

| | Example* | | | | | | | | | | |
|---|---|---|---|---|---|---|---|---|---|---|---|
| | c-1 | c-2 | c-3 | c-4 | c-5 | 6 | 7 | 8 | c-9 | 10 | 11 |
| Feed region | | | | | | | | | | | |
| A-1 | 0 | 0 | 0 | 6 | 0 | 0 | 0 | 0 | 0 | 0 | 0 |
| B-1 | 0 | 4 | 6 | 0 | 0 | 0 | 0 | 0 | — | — | — |
| B-2 | — | — | — | — | — | — | — | — | 0 | 0 | 0 |
| C-1 | 0 | 0 | 0 | 0 | 6 | 0 | 0 | 0 | 0 | 0 | 0 |
| C-2 | — | — | — | — | — | — | — | 0 | — | — | 0 |
| D-1 | 0 | 0 | 0 | 0 | 0 | 4 | 6 | 6 | 0 | 6 | 6 |
| E-1 | 0 | 0 | 0 | 0 | 0 | 4 | 6 | 6 | — | — | — |
| G-1 | 0 | 0 | 0 | 0 | 0 | 0 | 0 | 0 | 0 | 0 | 0 |
| Properties | | | | | | | | | | | |
| Vicat B [°C.] | 103 | 102 | 102 | 102 | 102 | 102 | 103 | 103 | 115 | 115 | 116 |
| MVI [ml/10'] | 14.9 | 13.5 | 13.8 | 16.5 | 15.7 | 13.4 | 16.4 | 19.3 | 28.1 | 30.1 | 32.1 |
| $a_k$, RT [kJ/m²] | 61.1 | 60.2 | 58.2 | 23.2 | 21.1 | 62.2 | 72.9 | 75.1 | 56.3 | 71.2 | 75.1 |
| $a_k$, −30° C. [kJ/m²] | 14.2 | 13.2 | 12.6 | 8.9 | 9.2 | 13.7 | 17.3 | 18.6 | 14.7 | 18.9 | 19.8 |
| Total C emission [mg/kg] | 59 | 61 | 63 | 62 | 63 | 51 | 49 | 49 | 41 | 34 | 33 |

*examples identified by "c" are comparative examples

TABLE 2

Parts by weight of components, region of respective feed, and properties of molding compositions produced

| Example* | c-12 | 13 | 14 | 15 |
|---|---|---|---|---|
| Pts. by weight | | | | |
| A-1 | 18.2 | 18.2 | 18.2 | 18.2 |
| B-1 | — | — | — | — |
| B-2 | 36.6 | 36.6 | 36.6 | 36.6 |
| C-1 | 32 | 32 | 32 | 27 |
| C-2 | — | — | — | 5 |
| D-1 | 5 | 5 | 5 | 5 |
| F-1 | 8 | 8 | 8 | 8 |
| G-1 | 0.2 | 0.2 | 0.2 | 0.2 |
| Feed region | | | | |
| A-1 | 0 | 0 | 0 | 0 |
| B-1 | — | — | — | — |
| B-2 | 0 | 0 | 0 | 0 |
| C-1 | 0 | 0 | 0 | 0 |
| C-2 | — | — | — | 0 |
| D-1 | 0 | 4 | 6 | 6 |
| F-1 | 6 | 6 | 6 | 6 |
| G-1 | 0 | 0 | 0 | 0 |
| Properties | | | | |
| Vicat B [°C.] | 110 | 110 | 111 | 111 |
| MVI [ml/10'] | 4.2 | 3.9 | 3.8 | 3.6 |
| $a_k$, RT [kJ/m²] | 8.5 | 12.1 | 12.5 | 13.1 |
| $a_n$, RT [kJ/m²] | 46 | 54 | 56 | 58 |
| Total C emission [mg/kg] | 54 | 43 | 42 | 43 |

*examples identified by "c" are comparative examples

Although, in comparison with known processes, there has been a marked reduction in the residence time of the compatibilizer, component D, during the mixing procedure in the extruder, when the thermoplastic molding compositions that can be produced by the processes of the invention are compared with known molding compositions based on impact-modified (methyl)styrene-acrylonitrile copolymers and on polyamides, they exhibit a further improvement in impact resistance and/or lower content of volatile components.

The invention claimed is:

1. A process for producing a thermoplastic molding composition, where the thermoplastic molding composition comprises
    a) as component A, from 3 to 79% by weight of one or more (methyl)styrene-acrylonitrile copolymers, which have no maleic-anhydride-derived units,
    b) as component B, from 15 to 91% by weight of one or more polyamides,
    c) as component C, from 5 to 50% by weight of one or more rubbers,
    d) as component D, from 1 to 25% by weight of one or more compatibilizers,
    e) as component E, from 0 to 2% by weight of one or more low-molecular-weight compounds, which comprise a dicarboxylic anhydride group,
    f) as component F, from 0 to 50% by weight of one or more fibrous or particulate fillers, and
    g) as component G, from 0 to 40% by weight of further additives,
    where each of the % by weight values is based on the total weight of components A to G, and these do not exceed 100% by weight,
    the process comprising mixing components A to G in a melt,
    by producing the melt comprising components A, B, and C in a first step of the process, in the absence of component D, and delaying the mixing to incorporate component D into the melt comprising components A, B, and C until a second step of the process;
    wherein the melt is produced in a screw extruder, which comprises, in a sequence along a direction of conveying, at least one feed zone, one plastifying zone, one homogenizing zone, and one discharge zone, after addition of components A, B, and C to the feed zone, in the first step of the process, in the absence of component D, and, in the second step of the process, after addition of component D to the homogenizing zone, the mixing to incorporate component D is carried out, and wherein the screw extruder has an effective length L, where the effective length L is defined as the distance from the first feed device for the addition of components A, B, and/or C to the discharge aperture in the direction of conveying, after addition of components A, B, and C, in the region from 0 L to 0.15 L, in the first step of the process, in the absence of component D, and, in the second step of the process, after addition of component D, in the region from 0.3 L to 0.99 L, the mixing to incorporate component D into the melt is carried out.

2. The process according to claim 1, wherein component C comprises a butadiene graft rubber and/or an alkyl acrylate graft rubber.

3. The process according to claim 1, wherein component D comprises one or more (methyl)styrene-acrylonitrile copolymers, which, based on the entirety of component D, have from 0.5 to 5% by weight of maleic-anhydride-derived units.

4. The process according to claim 1, wherein component E comprises maleic anhydride, phthalic anhydride, trimellitic anhydride, or a mixture thereof.

5. A thermoplastic molding composition, produced by the process according to claim 1.

6. A method for producing moldings, foils, or fibers comprising utilizing the thermoplastic molding composition according to claim 5.

7. A molding, fiber, or film, comprising the thermoplastic molding composition according to claim 5.

8. The process according to claim 2, wherein component D comprises one or more (methyl)styrene-acrylonitrile copolymers, which, based on the entirety of component D, have from 0.5 to 5% by weight of maleic-anhydride-derived units.

9. The process according to claim 2, wherein component E comprises maleic anhydride, phthalic anhydride, trimellitic anhydride, or a mixture thereof.

10. The process according to claim 3, wherein component E comprises maleic anhydride, phthalic anhydride, trimellitic anhydride, or a mixture thereof.

11. A thermoplastic molding composition, produced by the process according to claim 2.

12. The process of claim 1, wherein the thermoplastic molding composition comprises:
   a) from 5 to 55% by weight of component A,
   b) from 25 to 78% by weight of component B,
   c) from 15 to 45% by weight of component C,
   d) from 2 to 15% by weight of component D,
   e) from 0 to 1% by weight of component E,
   f) from 0 to 38% by weight of component F, and
   g) from 0 to 10% by weight of component G.

* * * * *